(12) United States Patent
Benson et al.

(10) Patent No.: US 8,970,393 B2
(45) Date of Patent: Mar. 3, 2015

(54) DATA ANALYSIS SYSTEM, SUCH AS A THEFT SCENARIO ANALYSIS SYSTEM FOR AUTOMATED UTILITY METERING

(75) Inventors: Eric Benson, Spokane, WA (US); Chris Bernardi, Spokane, WA (US); Michael Schleich, Newman Lake, WA (US)

(73) Assignee: ITRON, Inc., Liberty Lake, WA (US)

( * ) Notice: Subject to any disclaimer, the term of this patent is extended or adjusted under 35 U.S.C. 154(b) by 2118 days.

(21) Appl. No.: 11/692,996

(22) Filed: Mar. 29, 2007

(65) Prior Publication Data

US 2007/0247789 A1 Oct. 25, 2007

Related U.S. Application Data

(60) Provisional application No. 60/788,035, filed on Mar. 31, 2006.

(51) Int. Cl.
G08B 23/00 (2006.01)
G01D 4/00 (2006.01)
G06Q 50/06 (2012.01)

(52) U.S. Cl.
CPC ............... *G01D 4/006* (2013.01); *G06Q 50/06* (2013.01); *Y02B 90/243* (2013.01); *Y04S 20/325* (2013.01)
USPC ....................... 340/870.02; 324/110; 324/142

(58) Field of Classification Search
CPC ........ G01D 4/002; G01D 4/008; G01D 4/004
USPC ......... 340/637, 870.02–870.03; 324/110, 142
See application file for complete search history.

(56) References Cited

U.S. PATENT DOCUMENTS

| | | | | |
|---|---|---|---|---|
| 4,301,444 A | * | 11/1981 | Bruckert et al. | 340/870.02 |
| 5,086,292 A | * | 2/1992 | Johnson et al. | 340/637 |
| 5,155,481 A | | 10/1992 | Brennan, Jr. et al. | |
| 5,473,322 A | | 12/1995 | Carney | |
| 5,617,084 A | | 4/1997 | Sears | |
| 6,181,257 B1 | | 1/2001 | Meek et al. | |
| 6,232,886 B1 | | 5/2001 | Morand | |
| 6,801,865 B2 | * | 10/2004 | Gilgenbach et al. | 702/61 |
| 7,106,044 B1 | * | 9/2006 | Lee et al. | 324/110 |
| 7,400,264 B2 | * | 7/2008 | Boaz | 340/870.02 |
| 7,402,993 B2 | * | 7/2008 | Morrison | 324/142 |
| 2004/0021568 A1 | | 2/2004 | Seal et al. | |
| 2005/0190066 A1 | | 9/2005 | Schleich et al. | |

* cited by examiner

*Primary Examiner* — Albert Wong
(74) *Attorney, Agent, or Firm* — Hanley, Flight & Zimmerman, LLC

(57) ABSTRACT

Systems and methods for determining possible theft scenarios at utility meters are described. In some examples, the system receives information that indicates possible tampering of utility meter by a customer of a utility. In some examples, the system uses the information to determine a theft scenario. The system may then use the determined theft scenario as evidence against the customer.

29 Claims, 6 Drawing Sheets

DATA ANALYSIS SYSTEM, SUCH AS A THEFT SCENARIO ANALYSIS SYSTEM FOR AUTOMATED UTILITY METERING

CROSS REFERENCE TO RELATED APPLICATION(S)

This application claims the benefit of U.S. Provisional Patent Application No. 60/788,035, filed on Mar. 31, 2006, entitled DATA ANALYSIS SYSTEM, SUCH AS A THEFT SCENARIO ANALYSIS SYSTEM FOR AUTOMATIC UTILITY METERING, which is incorporated by reference in its entirety.

This application is related to commonly assigned U.S. Provisional Patent Application No. 60/788,134, filed on Mar. 31, 2006, entitled INTEGRATED DATA COLLECTION, ANOMALY DETECTION AND INVESTIGATION, SUCH AS INTEGRATED MOBILE UTILITY METER READING, THEFT DETECTION AND INVESTIGATION SYSTEM and U.S. patent application Ser. No. 11/692,991, entitled INTEGRATED DATA COLLECTION, ANOMALY DETECTION AND INVESTIGATION, SUCH AS INTEGRATED MOBILE UTILITY METER READING, THEFT DETECTION AND INVESTIGATION SYSTEM, filed Mar. 29, 2007, both of which are incorporated by reference in their entirety.

BACKGROUND

Loss or theft of utilities is a problem that many utility industries must face. For example, unscrupulous individuals will tamper with an electric meter by removing the meter and reinstalling it upside down (so that it decrements, rather than increments with utility usage), bypass the meter entirely, tamper with the meter to prevent it from incrementing (e.g. after opening a seal on the meter), cutting cables, and so forth.

If a theft or tamper is detected or suspected, the utility will send out a trained investigator to analyze the situation and, at times, pursue an appropriate course of action with an alleged thief/tamperer. However, utilities typically only have a few of these trained individuals, and often have no additional procedures to readily identify suspected thefts or meter tamperings and deal with such problems.

Utilities lose some amount of their commodity because of consumer theft, and in many case set up entire departments to deal with these concerns. Despite expending large amounts of resources on deterring theft, it has not been easy to deter theft in a proactive manner. Utilities would greatly benefit if they were able to receive irrefutable evidence that documents the occurrence of the theft of utilities. However, conventional systems do not provide such capabilities, as many merely rely on individual tamper flags when attempting to resolve theft situations. These and other problems exist with respect to preventing the loss of utilities due to theft.

DETAILED DESCRIPTION

Figure 1:
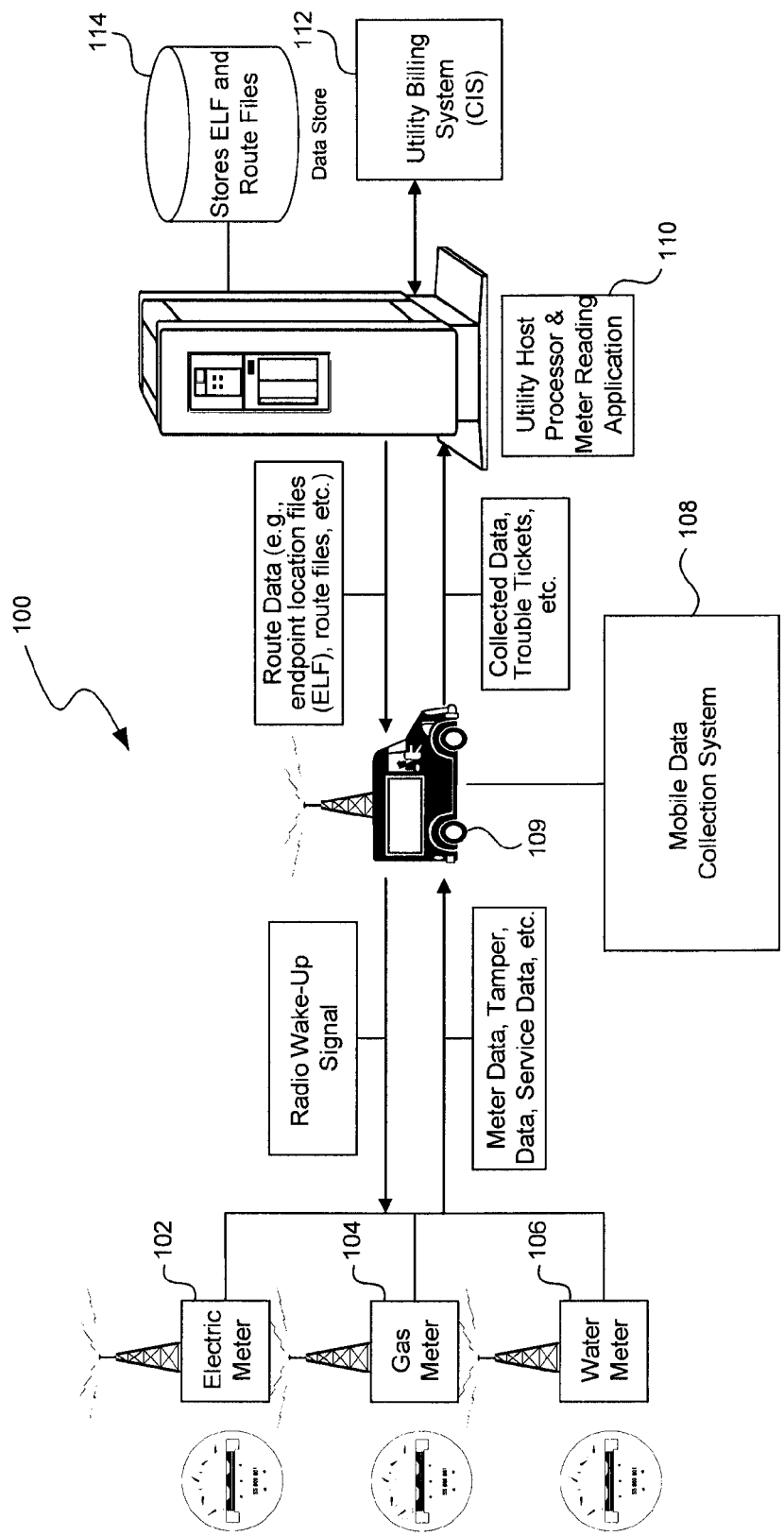
FIG. 1 is a block diagram of a mobile utility data collection system that employs aspects of the technology.

Described in detail below is a system to utilize data received from tamper indicators to recognize specific theft scenarios. In one implementation, the system receives different types of data within a fixed network (FN) from automatic meter reading (AMR) service points, including various types of tamper data. The system may filter and/or process any unnecessary data to extract data relating to certain tamper events. Looking at the tamper events together enables the system to identify specific theft scenarios. That is, the system provides utilities with the capability of turning large volumes of disparate tamper data into specific and actionable knowledge. Using the knowledge, the system may then target and validate real life theft situations, and, possibly more importantly, document solutions to the specific scenario or generate evidence. The evidence generated by the system may then be used to support various resolution models, such as to provide support in legal actions against a consumer found stealing utilities.

For example, an electric meter may simultaneously sense a "power outage" tamper event and a "meter removal" tamper event, followed by a "reverse rotation" tamper event. The meter transmits data relating to the sensing of these events (along with other data). The system receives the tamper event data and infers with a high level of confidence that a consumer most likely removed the electric meter from the socket, cross wired the leads that feed the meter, and re-installed the meter. The combination of theft events or flags enables the system to realize the consumer performed certain illegal modifications of the electric meter in order to get the meter to run backwards and remove consumption off of the meter's register, and thus, lower the consumer's bill.

Additionally, the system considers the timing of tamper events, as well as the order of tamper events, in determining a theft scenario. Using the above example, a the system may determine a different theft scenario (or that the scenario is not a theft scenario) if the power outage tamper event occurred before the meter removal event. Therefore, in some cases the system uses the order and timing of tamper events in determining theft scenarios. This is further illustrated in the exemplary theft scenarios described herein.

Integrating these capabilities into the automatic meter reading system also provides the utility with the ability to perform such theft detection without alerting consumers, because the data to be processed during the automatic reading of the meter is the data used to determine the theft scenarios. Therefore, in some cases the system enables a utility to innocuously collect irrefutable data pointing to specific types of utility theft.

Although many of the examples are discussed with respect to electric meters, the system may be incorporated and used with a number of different utilities, such as for use with water meters.

Various embodiments of the technology will now be described. The following description provides specific details for a thorough understanding and enabling description of these embodiments. One skilled in the art will understand, however, that the technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

Representative System

FIG. 1 and the following discussion provide a brief, general description of a suitable environment in which the technology can be implemented. Although not required, aspects of the technology are described in the general context of computer-executable instructions, such as routines executed by a general-purpose computer (e.g., wireless device, or personal/laptop computer). Those skilled in the relevant art will appreciate that the technology can be practiced with other communications, data processing, or computer system configurations, including Internet appliances, handheld devices (including personal digital assistants (PDAs)), all manner of cellular or mobile phones, embedded computers (including those coupled to vehicles), multi-processor systems, microprocessor-based or programmable consumer electronics, network PCs, mini-computers, mainframe computers, and the like. Indeed, the terms "computer" and the like are generally used interchangeably and refer to any of the above devices and systems, as well as any data processor.

Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network. In a distributed computing environment, program modules may be located in both local and remote memory storage devices.

Aspects of the technology may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the technology reside on a server computer, while corresponding portions reside on a client computer, such as a mobile device.

Referring to FIG. 1, an example of one data collection environment is shown. A mobile automatic meter reading (MAMR) system 100 is an example of one arrangement of elements, but others are possible, such as a Fixed Network (FN). The system 100 includes a collection of utility meters or service points (102, 104, and 106). The utility meters may be of the same or different types (e.g., electric 102, gas 104, water 106, or other (not shown)). The utility meters (102, 104, and 106) may be distributed in a bounded or unbounded geographical area. Each utility meter (102, 104, or 106) is connected to or associated with a utility consuming facility (not shown). For example, a utility meter may correspond with a household, a commercial facility, or another utility consuming facility or device. The system may also collect data from other data sources besides utility meters, as described herein.

While not illustrated in detail, each meter (102, 104, or 106) includes a storage component (not shown) for storing collected data before transmission to a data collection system. The storage component may store information identifying the meter, such as a meter identification number. In addition, each meter may be configured with a receiver/transmitter telemetry device (e.g., an encoder receiver transmitter (ERT)) capable of sending and receiving signals to and from a mobile data collection system 108. In general, these components (meter, storage, and telemetry device) may be collectively referred to as an "endpoint." However, the term "endpoint" may herein refer to any one of a number of possible configurations for locally collecting data, such as utility consumption data, tamper event data, and so on, and not only the sample configuration described above.

To facilitate MAMR or similar techniques, the mobile data collection system 108 may be installed in a vehicle 109 or be otherwise configured to be transported through a route (e.g., handheld). For example, the vehicle or system may include the appropriate antennas, power supply, any necessary mounts, etc. Of course, the system described herein can also be employed in a handheld device, or other in-field device.

The system 100 also includes a host processing system and/or meter reading application(s) 110 for processing collected meter reading data. The host processing system 110 may be a head-end server computer. In some embodiments, the host processing system and/or meter reading application(s) 110 use customer information to create route files used when driving the route to collect meter data. Examples of meter reading applications may include MV-RS™, Premier-plus4™, Viena™, and Integrator™, all by Itron, Inc. of Spokane, Wash. The host processing system and/or meter reading application(s) 110 may operate in association with systems operated by a utility company, such as a utility billing system 112 or, more generally, a customer information system (CIS). In this way, the host processing system and/or meter reading application(s) 110 can also communicate data to the mobile data collection system 108. This information may include both route file and endpoint location file (ELF) data, which may be stored in a data store 114 prior to export from the billing system/CIS. However, in some embodiments, endpoint location files may also be transmitted directly from the billing system/CIS 112 to the mobile data collection system 108. Likewise, data collected by the mobile data collection system 108 may be returned to host processing system and/or the meter reading application(s) 110 for processing.

Figure 2:
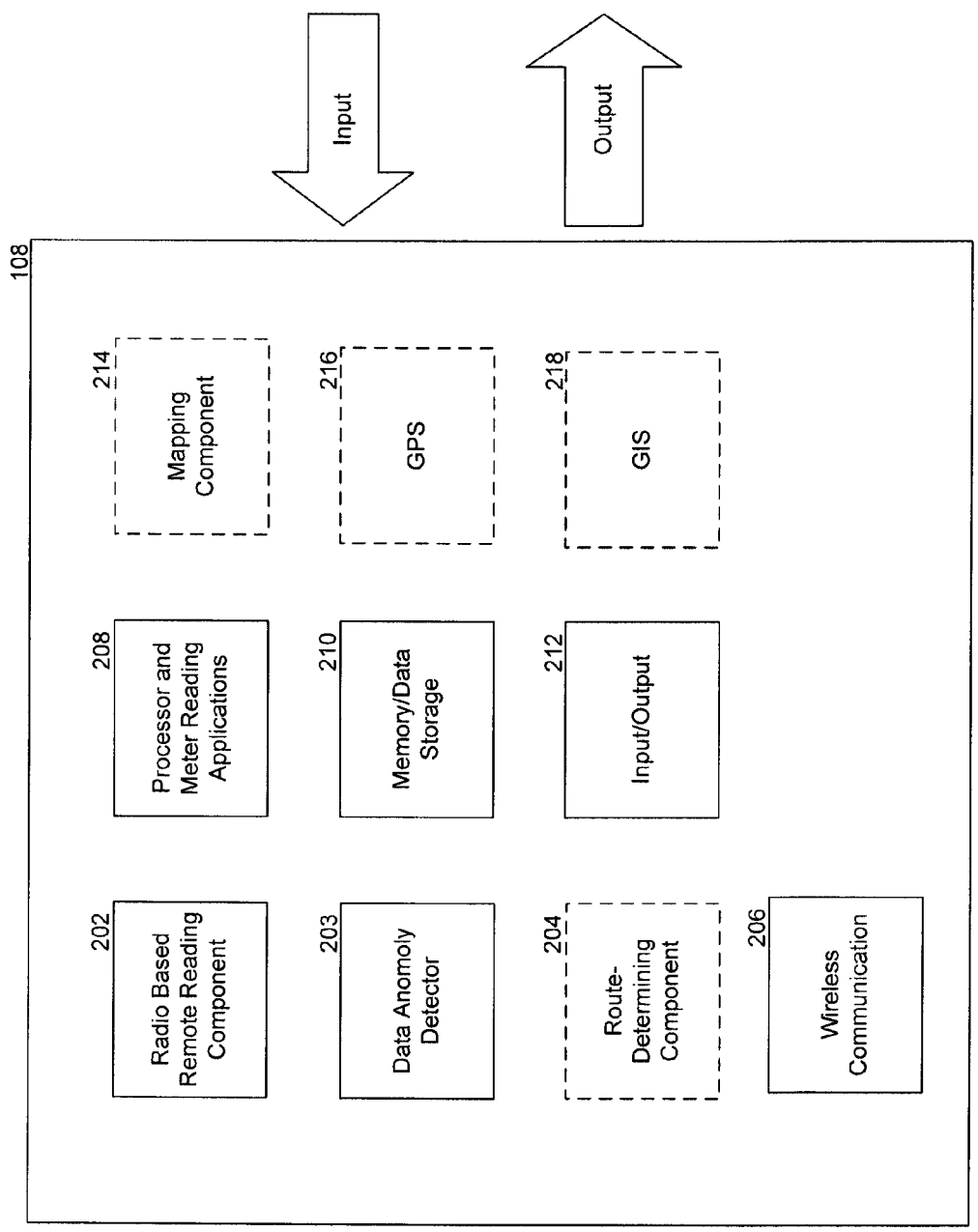
FIG. 2 is a block diagram of a meter or data collecting reading system of FIG. 1.

Referring to FIG. 2, the data collection system 108 of FIG. 1 is shown in more detail. The data collection system 108 includes a remote reading component 202 (e.g., radio based), a data anomaly detector 203 (described below), and an optional sequencing component 204. In some embodiments, these and other portions of the data collection system 108 may effectively be combined into a single system. For example, because many of the features required for collecting data from endpoints may be useful in identifying anomalous data and determining an optimal sequence for communicating with or investigating endpoints. Here, however, they are illustrated separately to demonstrate the distinct functions of the components.

The data collection system 108 also includes a wireless component 206, which, in some embodiments, may include an antenna and a transceiver (not shown). The transceiver of the wireless component 206 sends signals to wake up endpoints that function in "wake-up" mode to receive and manage incoming data. A processor with meter-reading and other applications 208 provide capabilities to control several processes, including managing collected data, and other functions described herein.

The data collection system 108 may store collected data in a memory or other storage device 210 associated with the data collection system 108, such as a non-volatile memory. For example, the memory 210 can store not only collected meter data, but also route information, performance, communications statistics, history, and other data noted herein. As described below, the memory 210 can store both internal and external data within the in-field device 108, to thereby avoid the need for the device to access a database at the host processing system 110. This information may be used as input to 204 to help identify anomalous data from endpoints.

A user input/output component 212 provides an appropriate user interface for an operator of the data collection system 108. For example, the data collection system 108 may provide a color touchscreen display for ease of use, and for clear graphical displays. Other user input/output options are possible, including mouses, microphones, speakers, joysticks, keyboards, LCD screens, audio, etc. One application of the input/output component 212 includes displaying and controlling mapping images generated by an optional mapping component 214. In this way, the field worker is provided with feedback, so that he or she can determine which meter readings have been completed on a particular route and so he or she can view endpoints on the route in relation to the vehicle and to other endpoints. The input/output component 212 and mapping component 214 can graphically display suspect endpoints for in-field investigation by the field worker, as described below. Optional Global Positioning System (GPS) 216 or Geographical Information System (GIS) 218 components may also be included. Further details regarding mapping and location determining components may be found in commonly assigned U.S. patent application Ser. No. 11/064,433, entitled Utility Endpoint Communication Scheme, Such As For Sequencing The Order Of Meter Reading Communications For Electric, Gas And Water Utility Meters, filed Feb. 22, 2005, and application Ser. No. 10/903,866, filed Jul. 30, 2004, entitled Mapping In Mobile Data Collection Systems, Such As Utility Meter Reading And Related Applications.

Figure 3:
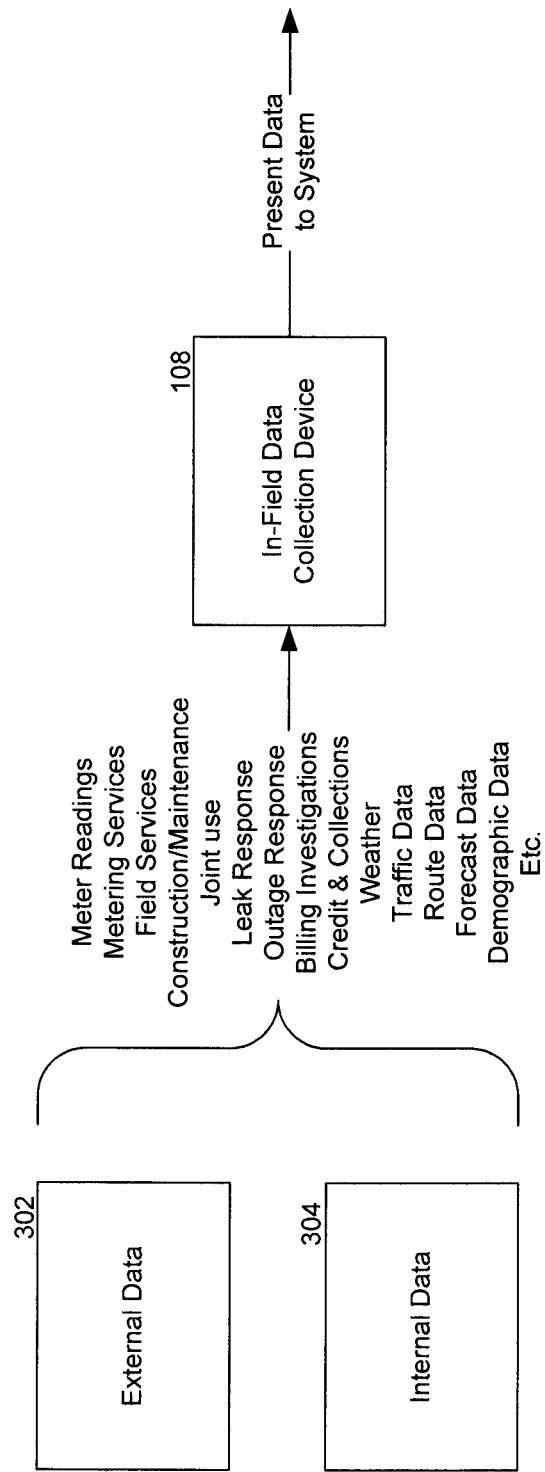
FIG. 3 is a data flow diagram illustrating suitable data flows that occur in performing suspected theft/tamper detection, and providing instructions to a field worker or meter reader.

Referring to FIG. 3, the in-field data collection device 108 may receive external data 302 and internal data 304, with which it applies one or more rules or conditions to generate output to the utility. External data may represent data external to the system 100, such as weather data, traffic data, demographic data, road construction/maintenance data, news data, etc. Internal data represents data gathered or generated by the system 100, such as meter readings, metering services, field services, utility construction/maintenance data, joint use data, leak or outage response data, billing investigation data, credit and collections data, route data, forecast data, trend data, and so on. The in-field data collection device 108 employs some or all of the internal and external data, together with locally stored rules, and presents the data to the utility for further processing with respect to determining specific theft scenarios.

Generally, the system will use interval data messages from electric ERTs. However, data messages from other types of utility meters could also be used. In some cases, the system utilizes a Fixed Network (FN) scheme to collect data in near real time. This allows a quick time-based characterization of theft by processing raw data (such as counters) in an application layer within the system. In some cases, the application layer may be built into the meter device. In these cases the system assesses, using logic and documentation insight, when the meter is not read via the AMR system at least at a daily rate. In some cases, this approach may allow a utility to focus on scenarios of particular interest. Also, this approach may allow the utility to identify suspected infrastructure problems, such as hot meter sockets.

Figure 4:
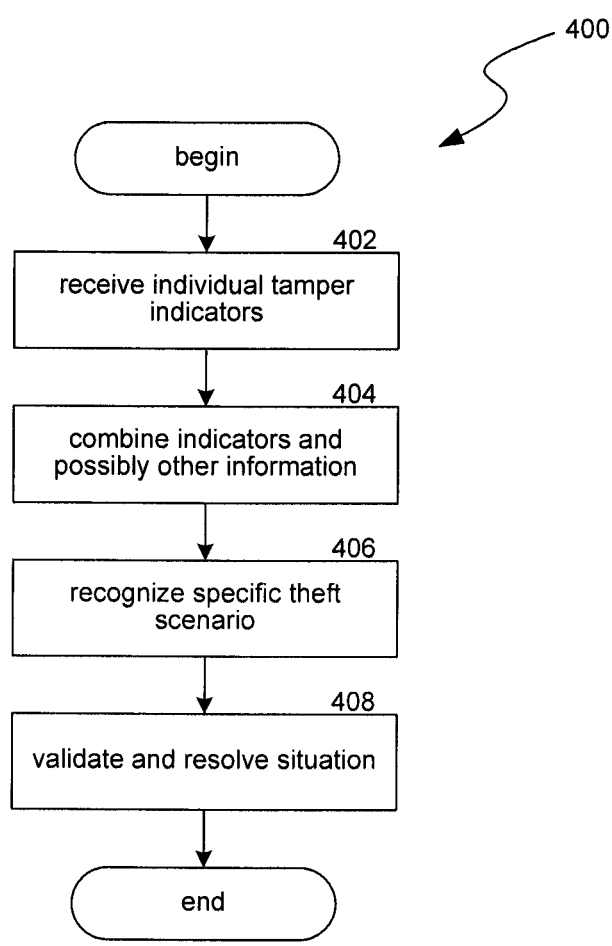
FIG. 4 is a flow diagram illustrating a process for identifying and processing theft scenarios.

Referring to FIG. 4, an example of a method for determining and resolving a specific threat scenario within a fixed network is shown as a routine 400 for processing input data and resolving the situation. Beginning in block 402, the routine 400 receives input data containing individual tamper indicators via the radio-based remote reading component 202, wireless communication component 206, or other similar data receivers. Under block 404, the system processes the meter data and may combine the processed data with additional data, such as data relating to a customer's history of payments, credit scores, or other data described herein. Further details regarding processing of data are provided with respect to FIG. 5.

In block 406, the system attempts to recognize a specific theft scenario based on the received tamper indicators. Further details regarding the theft scenario are provided with respect to FIG. 5. Under block 408, the system validates the specific theft scenario and additionally may provide reports or other determinations in order to resolve the theft scenario. Based on the reports or determinations, the utility may decide how to further proceed (such as rely on the report when taking legal action against a consumer).

Some examples of uses of data and rules by the in-field device 108 will now be provided. For example, the in-field device 108 may employ rules with various external data 102, such as weather and season data, which greatly affect the usage of power and other utilities (e.g., more use of water during the summer). Profile data based on zipcodes can indicate greater uses of utilities. For example, upscale zipcodes associated with large homes typically use more utilities, such as electricity to heat/cool larger homes. The utility provider can determine the size of an electrical service provided to a house and other data associated with that location. This data is used with historical data to determine whether someone may have tampered with the meter. Historical data could show that a person typically uses power at a given rate for a given time of year. If usage is below that historical amount by a certain standard deviation, then the system may use this additional data in determining a specific theft scenario.

Figure 5:
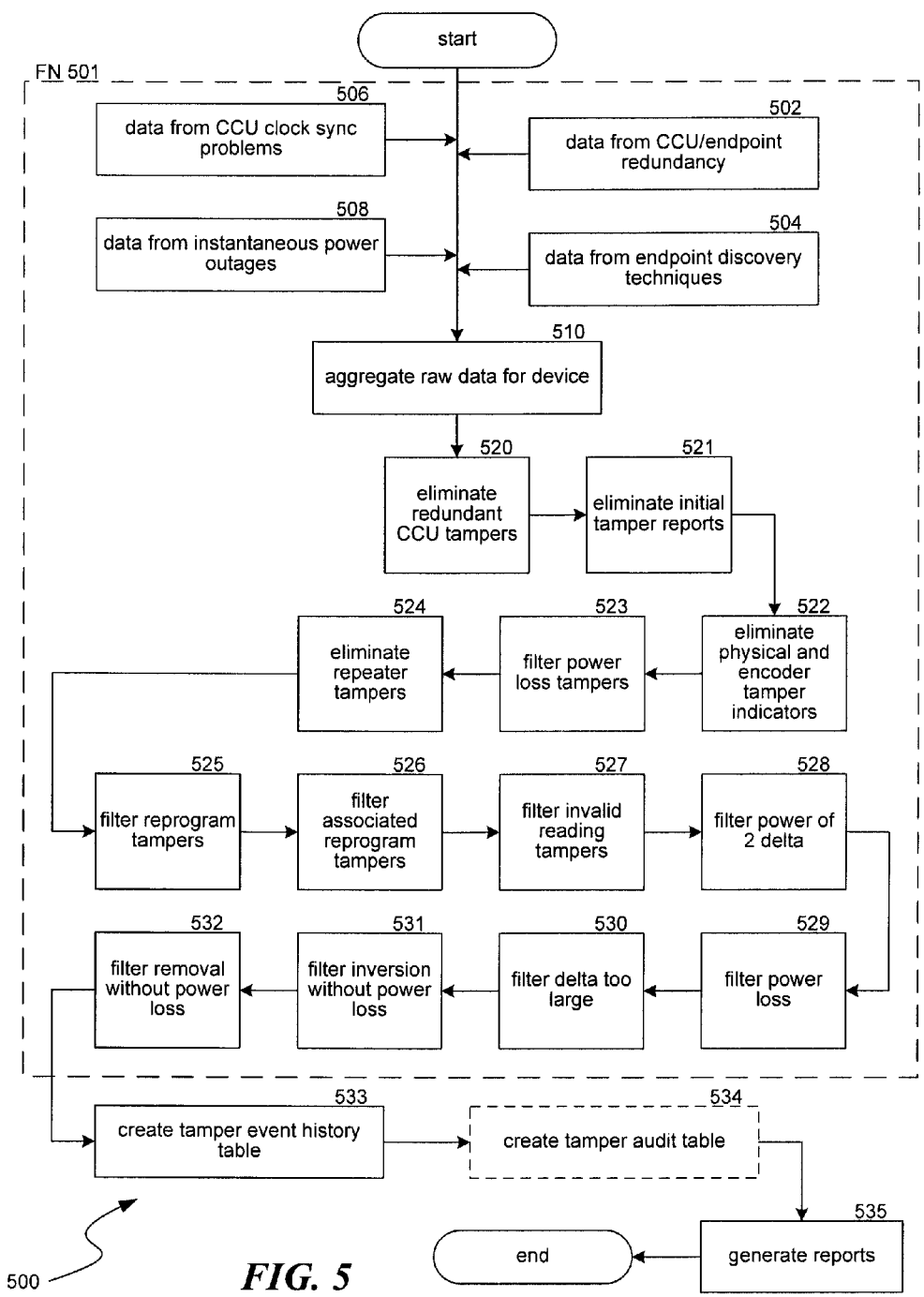
FIG. 5 is a data flow diagram illustrating suitable data flows that occur in identifying theft scenarios.

Referring to FIG. 5, an example of a method for identifying a specific theft scenario is shown as a routine 500 for processing data received from AMR endpoints and central collection units (CCUs) within a fixed network (FN) 501. Large amounts of tamper records are uploaded by the FN, such as data from CCU/endpoint redundancy 502, data from endpoint discovery techniques 504, data from CCU clock synchronization problems 506, data from instantaneous power outages 508, and so on. These data sources will be described in greater detail herein.

The tamper records (or tamper signals or flags) will be referred to as "tampers" in the following discussion. These signals or flags signify an occurrence of a consumer "tampering" with a meter or other utility device, such as removing a meter from a socket. Therefore, the signals that indicate a removal may also be called "tampers," although they should not be confused with tampers that relate to physical acts by consumers in damaging or altering utility devices such as meters.

In block 510, the FN uploads this and other data for a device and certain algorithms within the FN apply filtering 520-532 to the data based on certain rules. The rules may be based on an understanding of the system's behavior, resulting in a scaled down view of actual tamper events that may provide a manageable set of data. The system may then process the manageable data in order to determine a specific theft scenario, as is discussed with respect to FIG. 4.

This flow diagram (and other diagrams discussed herein) do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. That is, the system may or may not perform some of all of the filtering processes, depending on the data to be processed. Additionally, the system may perform steps in a different order than the order depicted in FIG. 5.

In the example of FIG. 5, the filtering of redundant data, or noise, is shown in blocks 520-524. Generally, the system considers much of the uploaded data to be noise, and filters out a large amount of unnecessary data as noise using a filtering algorithm. For example, in block 520, the routine eliminates redundant CCU tampers. In a normal Fixed Network installation redundancy results in a high confidence of retrieving data from endpoints. However, this redundant data may hinder the analysis of tamper information if not filtered properly. The redundant CCU tamper filter examines device level tampers without regard to which CCU the tamper information came from. Tampers are evaluated by assessing each tamper record to determine if a state change occurred, or if the tamper record is the same as a previously delivered tamper. Redundant records or flags are deleted or removed from further consideration.

Proceeding to block 521, the system may employ a filter to eliminate initial tamper reports. The first time a CCU hears an endpoint, it creates a new set of tamper data for that endpoint and uploads the full tamper set to a collection engine within the FN. If the CCU suffers an unexpected reboot, the CCU must 'reacquire' its endpoint list and rebuild new tamper sets for each endpoint. This situation can result in a substantial number of redundant tamper records uploaded to the collection engine. Recognizing this behavior allows a tamper filtering algorithm to eliminate a substantial number of tamper records.

Next at block 522, the system may utilize a filter to eliminate physical and encoder tampers (sometimes referred to as "tamper1/tamper2" indicators) These indicators represent physical and encoder tamper occurrences and are contained in Interval Data Message (IDM) Endpoints for backward compatibility with legacy Standard Consumption Message (SCM) reading systems such as Mobile Collector. These counters are redundant to other more meaningful tamper counters managed by an IDM endpoint and can be eliminated by the tamper filtering algorithm.

In block 523, the system may further utilize a filter to eliminate any invalid power loss tamper data. Although power loss tamper events are necessary to validate tamper scenarios as well as to help in identifying problematic conditions such as faulty meter sockets, the system may still filter such tampers according to filtering rules to insure that only valid occurrences are recognized. For example, a filtering rule may be to filter any power loss tampers that are received at the same time as a reprogram tamper (which would be an invalid scenario), or to filter any power loss tampers that may increment by a greater value than expected by the system, and so on.

At block 524, the system may also eliminate repeater tampers. Repeater status messages uploaded periodically by repeaters in the Fixed Network result in tamper records stored in a Fixed Network database. These may be ignored or eliminated by the tamper filtering algorithm because they are redundant.

Once tamper data has been reduced by the tamper filtering algorithm, as is shown in blocks 520-524 and much of the 'noise' has been eliminated, the remaining tamper state changes may be checked to determine if any one state change represents a valid tamper situation, or is possibly caused by packet corruption in transit to the CCU (this stage of filtering may sometimes be referred to as "tamper quality assurance"). Blocks 525-532 depict examples of checking the remaining tampers. Also, rather than simply filtering and removing invalid tamper, the system places any tamper data that fails validation into a "TamperAudit" table in the Fixed Network database, allowing for easy analysis of filtered data.

For example, in block 525, the system may filter reprogram tampers. Some meters (such as the CENTRON meter) do not support the reprogram tamper found in certain 45 series IDM endpoint devices. Consequently, any reprogram tampers will be filtered except when the CCU uploads tamper data to the collection engine the first time. This first upload sets the initial state of tamper data for the device, and the presence of a reprogram tamper in this case is expected since that tamper is part of the normal 45 series IDM endpoint tamper set. This exception helps scenario reporting differentiate initial upload of tamper data from a device from subsequent uploads and therefore is not filtered.

Moving to block 526, the system may also filter other reprogram tampers. As discussed above, CENTRON meters may not support the reprogram tamper found in 45 series IDM endpoint devices. Consequently, messages containing a reprogram tamper may be considered to be a bad message, and all tamper values associated with that packet will be filtered. As above with the reprogram tamper filter of block 525, the initial report of tamper data from a device will not have the reprogram tamper data filtered.

Next at block 527, the system may filter invalid reading tampers. If a reading fails reading validation, the system may filter an associated invalid reading tamper. Reading validation occurs as part of the Reading Quality Assurance (RQA) process, but a further check is made during tamper processing. The previous and next consumption reading for the device is checked for a reasonable linear progression of reading values. A tolerance is necessary since it is possible for data to be delivered from multiple CCUs with a slightly different time stamp. This means that a reading that is less than a previous reading may still be reasonable, and consequently tamper values should be stored rather than filtered. Acceptable tolerance values are generally dependent on the size of service (how much energy is being consumed, is the value coming from an industrial meter or a residential meter, amount of redundancy in the system (the number of CCUs that hear an endpoint), frequency of the upload to the headend of the system, etc. Tolerance values may be set to a specific number (such as 20) or may be a range of numbers, again depending on the above factors. The algorithm takes the possibility of device reading rollover into account when evaluating the progression of readings and which tampers to filter.

At block 528, the system may filter invalid tamper values related to a power of two delta value. Tamper values (or, tamper counters) refer to numeric counts of the number of times the system recognizes a tamper event. For example, some instances of packet corruption will result in a single bit error in a particular field. Consequently, evaluating tamper value changes that are exact powers of 2 is a valuable check. Because many tamper counters roll over at 256 units (Reverse Rotation is the exception, rolling over at 16 units). Reviewing exact powers of 2 may also filter unwanted data. This rollover behavior must be accounted for when calculating an actual delta value (change of value) between two consecutive tamper values.

In some cases, some tamper counters are more prone to incrementing than other counters. For example, the power loss tamper is generally more likely to take larger jumps than other tampers. This is because repeaters serialize meter packets delivered to the CCU, resulting in a possibility of roughly 15 minutes of time between the CCU hearing endpoint packets. In an environment that has fairly frequent instantaneous power loss occurrences, the power loss tamper could increment several times between the times the meter is heard by the CCU. Consequently, the power loss tamper (as an example) may require a different threshold applied to the delta value than other tampers.

A "Power of 2 Delta" filter takes advantages of such considerations. Any tamper could increment by some amount and not necessarily be indicative of a packet corruption, so a threshold value is necessary for each tamper type. Using the power loss tamper as an example, the "Power of 2 Delta" filter will only filter changes of tamper values that are greater than a value following the rule of $2^n$, n>3, (leading to tamper values of 16, 32, 64, and so on). All other tampers will filter values that jump at least by a factor of $2^n$, n>2.

In block 529, the system may utilize a filter to remove invalid tamper values related to power loss. This filter looks at a special case associated with power loss tampers where the delta between two consecutive recognized power loss tampers is high (greater than 30 units) and the CCU did not deliver a device restoration alarm within a 15 minute window prior to the tamper date/time. During a power restore, the CENTRON meter will increment its power loss tamper counter and set a data status flag associated with the interval in which the power loss occurred indicating to higher level systems that a power loss alarm condition occurred. This means that a restore alarm should be seen at a collection engine (e.g., CCU) that roughly coincides with the power loss tamper increment. Evaluating each and every power loss tamper for this behavior would be costly as it involves additional database accesses and resources. However, if a power loss has a suspicious delta value increment, it will trigger this check and filter the power loss if no associated restore alarm exists. Conversely, if the power loss tamper delta looks too large but there is a correlating alarm in the database, it implies that the power loss is not a corrupt packet situation and may not remove such tampers.

Next, at block 530, the system may remove tampers with invalid tamper values relating to the delta being too large. This filter applies to tampers other than power loss tampers where the delta value between consecutive tamper instances is not filtered by the "Power of 2" filters above, but exceeds a threshold (e.g. is set at 30 units). In some cases this is not an absolute indication of packet corruption, and the threshold and overall validity of this filter should be evaluated over time.

At block 531, the system may employ a filter that removes inversion tampers in some cases. It is unlikely to have an inversion tamper increment without an associated power loss tamper increment. If these situations, the inversion tamper will be filtered by the system.

Like the filter in block 531, block 532 depicts a filter that filters removal tampers without associated power loss tampers, as there should always be a power loss increment when there is a removal increment. In these situations, the system will filter the removal tamper.

Therefore, the above filters (those discussed with respect to blocks 525-532) may remove invalid flag combinations in order to reduce the data set to be further analyzed by the system.

The data (that is, tamper values) that has passed through the filters discussed with respect to blocks 520-532 is placed into a "TamperEventHistory" table (block 533) in the Fixed Network database. An exemplary example of the table ("Table 1") is shown as follows:

TABLE 1

"TamperEventHistory" table.

| Column Name | Type | Can be Null | Description |
| --- | --- | --- | --- |
| DeviceId | INT | False | Integer ID value of the reading device. |
| DeviceType | SMALLINT | False | Value mapping to one of several defined Device (ERT) Types, such as those manufactured by Itron. Valid Values are as given by entries in the DeviceTypes table. |
| ChannelNumber | SMALLINT | False | This field indicates which specific channel (physical link between a meter and an endpoint) is referred to by this record. Valid Values: 0 to 3. |
| TamperDateTime | DATETIME | False | The date/time in UTC when the Tamper event occurred. Valid Values: datetime. |
| TamperType | SMALLINT | False | The type of tamper event recorded by the device. Valid values are found in the TamperTypes table. |
| Tamper | SMALLINT | False | The Tamper value associated with this particular tamper event. Tamper values have different ranges depending on the type of device and the type of tamper. |
| PrevTamperDateTime | DATETIME | True | The date/time in UTC when the previously recognized Tamper event occurred. Valid Values: datetime. |
| PrevTamperType | SMALLINT | True | The type of tamper event recorded by the device for the previously recognized tamper event. Valid values are found in the TamperTypes table. |
| PrevTamper | SMALLINT | True | The Tamper value associated with the previously recognized tamper event. Tamper values have |

TABLE 1-continued

"TamperEventHistory" table.

| Column Name | Type | Can be Null | Description |
|---|---|---|---|
| | | | different ranges depending on the type of device and the type of tamper. |
| Reading | BIGINT | True | A consumption reading value obtained by a device at the time the tamper event occurred. Valid Values: 0 to 9999999. |
| PreviousReading | BIGINT | True | A consumption reading value obtained by a device prior to the current tamper event. Valid Values: 0 to 9999999. |
| PreviousReadingDateTime | DATETIME | True | The date/time the previous reading was received. Valid Values: Date/Time |
| NextReading | BIGINT | True | A consumption reading value obtained by a device after the current tamper event. Valid Values: 0 to 9999999. |
| NextReadingDateTime | DATETIME | True | The date/time the next reading was received. Valid Values: Date/Time |
| DecodeType | TINYINT | True | DecodeType is a lookup value to determine how to decode reading data received from an endpoint. Valid Values: 0-255 |
| RunDateTime | DATETIME | True | The date/time when the spBHTamperHistory routine was run (the filtering algorithm). This value is used in deciding what tamper data has arrived since the last run of the spBHTamperHistory routine. Valid Values: datetime. |
| RecordDateTime | DATETIME | True | The date/time when this record was inserted/update in the table. Valid Values: datetime. |

Additionally, the tamper values that passed through the redundancy filters (shown in blocks 520-524) are placed in a "TamperAudit" table (block 534) in the Fixed Network database, as discussed above. An example of this table ("Table 2") is shown as follows:

TABLE 2

The "TamperAudit" table

| Column Name | Type | Can be Null | Description |
|---|---|---|---|
| Same structure as above | | | |
| Reason | VARCHAR (30) | True | This field contains text reflecting the reason the Tamper data was filtered. Valid Values are: Reprogram Reprogram Associated Reading Validation Failed Tamper Value Jump - Power Loss Tamper Jump - Power of 2 Tamper Value Validation Failed Inversion with no Power Loss Removal with no Power Loss |

Using the above data tables (especially Table 1), the system may generate reports that provide a reliable indication of a specific theft scenario. For example, the system utilizes the tables of data to construct a tamper scenario matrix which then indicates the specific theft scenario based on the tampers that have passed through the filtering algorithms and have been placed into the matrix.

For example, the system may use an "All Tampers Query" to extract tamper information from the "TamperEventHistory" table for presentation as a report (discussed herein). This query results in all initial tamper records being excluded, focusing on actual state changes. This query returns the same fields as were in the previous version of the tamper filtering process, but no longer has to focus on the exclusion of suspicious and known bad data, as that filtering is handled by Tamper Quality Assurance, or TQA (the filtering represented by blocks 525-532 of FIG. 5).

The system may generate additional reports, depending on the type of query to be run. In one example, the system may run a query excluding the power loss tamper. In these cases, the system may invoke a "No Power Loss Query" that is used to extract tamper information from the "TamperEventHistory" table, excluding power loss tampers, for presentation. The purpose of presenting tampers without power loss is that it may significantly limit the number of records shown in order to focus on these other tampers. Note that this report is analogous to the previous All Tampers Query, and likewise, is not a scenario based query. Therefore, the system may generate reports based on data that does not pass through all the filters, or may generate reports excludes even the tamper data that passed through the various TQA filters.

The "TamperAudit" table contains all data filtered by the TQA process. The Tamper Audit report presents all data in the "TamperAudit" table sorted by "DeviceId," "TamperDateTime," and "TamperType." The "Reason" column contains the reason why a given record was filtered. The possible "Reason" values and each reason is discussed in the TQA discussion above.

The tamper filtering algorithm is implemented as a stored procedure in the Fixed Network database. This procedure may be run periodically, and the query that feeds a tamper report (such as an Excel Spreadsheet) may be run after the stored procedure has executed in order to report the most current tamper events. The tamper report is described in greater detail herein.

In one example, the algorithm is on an hourly schedule. The algorithm keeps track of when it last ran so that it only analyzes data that arrived in the system after the last run date. This results in a very efficient analysis of data. A typical run will complete in a few seconds assuming hourly execution. A benefit of frequent execution is that the "TamperEventHistory" table is kept up to date and tamper reporting that targets that table is constantly kept fresh. An additional benefit to this method of updating the "TamperEventHistory" table is that it becomes very easy to assess tamper arrival rates over specific time periods. This may be of interest in certain reporting scenarios.

Generally, the algorithms are run as reports external to the FN collection engine. However, these algorithms may also run within the FN user interface.

Figure 6:
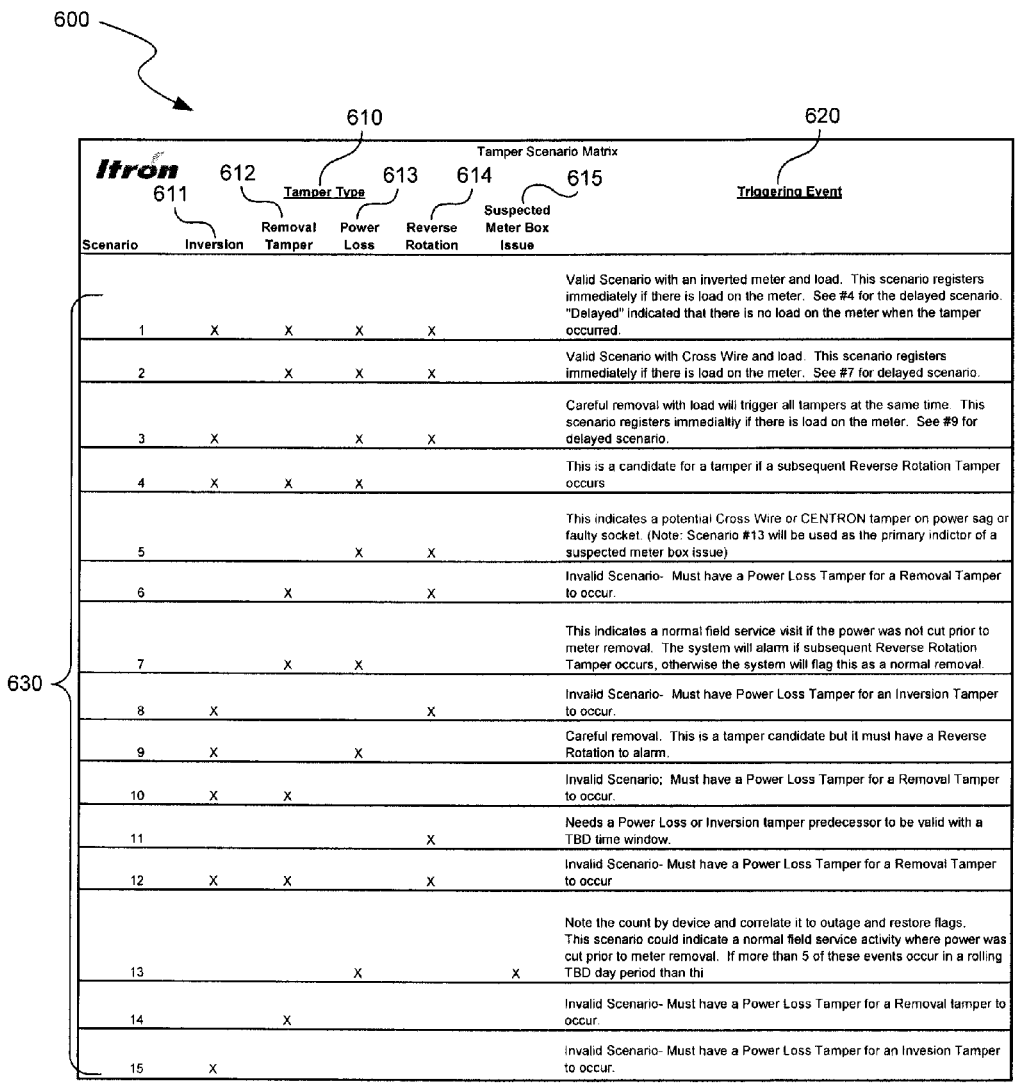
FIG. 6 is a table illustrating examples of theft scenarios based on tamper information.

Referring to FIG. 6, a matrix or table 600 illustrating examples of theft scenarios based on tamper information is shown. For example, table 600 may be created after the system invokes an "All Tampers Query" to extract tamper information from the "TamperEventHistory" table for presentation. The table 600 includes columns for tamper type 610, including tamper types of "inversion" 611, "removal" 612, "power loss" 613, "reverse rotation" 614, and "suspected meter box issue" 615. Additionally, the table contains a column named "triggering event" 620 that provides insight into the type of tamper scenario defined by the inclusion of exclusion of tampers. The table also includes rows 630 for 15 scenarios ("Scenarios 1-15"). One skilled in the art will appreciate that the table may comprise more or less scenarios and may also comprise tampers not shown in FIG. 6.

For example, the system may also consider reprogram tampers. These tampers may be used with field programmable gate arrays, reprogrammable memory stored in a meter, and so on. Other tampers may include tampers in water meters (such as leak tampers, reverse flow tampers, tilt tampers, cut cable tampers, and so on), tampers in gas meters (such as magnetic tampers, tilt tampers, cut cable tampers, and so on) and other electrical or other meter tampers.

Examples of the scenarios depicted in FIG. 6 will now be discussed in greater detail:

Scenario 1:

This scenario shows a high probability tamper situation that occurs when someone pulls a meter from its socket and replaces it upside down. In this case, the power loss and removal tampers are flagged as a result of the meter being pulled in such a way that the tilt switch is triggered, then the meter recognizes that it is upside down at reboot, and finally, there is sufficient load on the meter that two watt hours of consumption have occurred within 24 hours. The scenario occurs when concurrent tampers of inversion, removal, power loss, and reverse rotation occur (although reverse rotation may also be a delayed tamper).

Scenario 2:

This is a high probability tamper situation where removal and power loss tampers were received concurrently and reverse rotation was received within a 24 hour period. This situation has been referred to as a "Cross Wire" scenario, where the meter was removed (removal and power loss) and placed back in its socket. Since no inversion tamper was received, there is no reason to suspect the meter is upside down in its socket, but the presence of the reverse rotation tamper at the same time or within close proximity to the other tampers indicates that the meter is measuring backwards, probably indicating that the meter was cross wired while out of its socket.

Scenario 3:

This is a high probability tamper situation that results when the meter is very carefully removed from its socket so that the tilt switch does not trigger, but there is a concurrent power loss, inversion and reverse rotation within close proximity. The close reverse rotation indicates that the meter is under sufficient load to cause two watt hours of consumption within a 24 hour time period after the initial tampers were recognized. The scenario occurs when concurrent tampers of removal, power loss, and reverse rotation occur (although reverse rotation may also be a delayed tamper).

Scenario 4:

This scenario shows a suspicious tamper situation that occurs when someone pulls a meter from its socket and replaces it upside down, but the low load on the meter results in no known reverse rotation at the time the query is run. In this case, the power loss and removal tampers are flagged as a result of the meter being pulled in such a way that the tilt switch is triggered, then the meter recognizes that it is upside down at reboot. Reverse rotation has not been recognized yet in this case as the meter bubbled up its tamper message prior to two full watt hours of consumption occurring. The next step may be to wait to see if a reverse rotation tamper occurs at some later time. This situation could also be the result of a normal meter pull. In this case, someone has pulled the meter from its socket in such a way that the tilt switch is triggered (removal and power loss). It is possible that when replacing the meter in its socket, there has been enough motion during the meters power up sequence that the inversion tamper flag was activated. In this case, the meter is not actually upside down, and will never register a reverse rotation.

Scenario 5:

This is a lower probability tamper situation that results when the meter is very carefully removed from its socket so that the tilt switch does not trigger but there is a power loss and the meter reports a reverse rotation. Additionally, there is no inversion tamper to explain the reverse rotation, meaning that it is possible the meter was cross wired while out of socket. This scenario will also occur in situations when the CENTRON meter is in a 'hot socket'. In this situation, the 'hot socket' is causing the meter to believe there is a power loss and an accompanying power sag at startup time will cause the reverse rotation tamper flag to increment. This situation may be identified by a reasonably high occurrence rate of power loss tampers from the meter, and can be ignored as a tampering situation in that case. However, damage to the meter is viewed as inevitable if the meter is left in this "hot socket". In these cases, the system may automatically issue a work order ticket or alert the system of the potentially dangerous situation.

Scenario 6:

This is likely an invalid scenario as it should not be possible to have a removal tamper without an accompanying power loss. TQA should filter this situation.

Scenario 7:

This is a medium probability tamper situation where removal and power loss are received concurrently and no subsequent reverse rotation has been received. Encountering removal and power loss concurrently is a very typical situation when a field visit to the meter has resulted in the meter being pulled and replaced for some reason. This scenario can also trigger when the meter is pulled and replaced by someone other than a Utility representative. If the tamper condition is correlated to a field service database for a known field visit, it may be possible to simply ignore it.

Scenario 8:

This is likely an invalid scenario as it should not be possible to have an inversion tamper without an accompanying power loss. TQA should filter this situation.

Scenario 9:

This is a medium probability tamper situation that results when the meter is very carefully removed from its socket so that the tilt switch does not trigger but there is a concurrent power loss and inversion and no associated reverse rotation.

The lack of the reverse rotation tamper indicates that the meter either is not upside down in the socket, or not enough energy has been consumed to cause the requisite two full watt hours of consumption to trigger a flag. If the meter is upside down, the reverse rotation tamper will eventually increment and the Scenario 3 with delayed reverse rotation scenario reports the situation. If a reverse rotation tamper is never seen, it is still possible that this condition is indicating an actual tamper event. If the meter is removed from its socket very carefully but handled very roughly when being replaced, it is possible for enough movement to be generated to cause the inversion tamper to activate. If such a situation can be correlated to an actual field visit, the tamper condition could be ignored. However, if there was no known activity in the field with the meter, it could indicate an actual tamper event.

Scenario 10:

This is likely an invalid scenario as it should not be possible to have a removal tamper without an accompanying power loss. TQA should filter this situation.

Scenario 11:

Evaluation of this scenario is implied in all of the "Delayed Reverse Rotation" scenarios described above. Any scenario that checks for the existence of a reverse rotation tamper within 24 hours of the original event will be watching for this specific scenario.

Scenario 12:

This is likely an invalid scenario as it should never be possible to have either a removal tamper or an inversion tamper without an accompanying power loss. TQA should filter this situation.

Scenario 13—Occurrence Count:

This scenario returns a list of meters/occurrence counts for those meters that meet the following criteria. If more than 5 of power Loss or power loss/reverse rotation events occur in a rolling 10 day period then this indicates a possible meter box issue.

Scenario 13—Power Loss Only:

This is a low probability tamper scenario that could indicate a normal field service activity where power was cut prior to meter removal. If more than 5 of these events occur in a rolling 10 day period then this indicates a possible meter box issue. Note that this scenario looks at power loss tampers where there is no other associated tamper condition. It is possible that a reverse rotation tamper could come during or after this condition as a result of a power sag or 'hot socket' condition. Tamper events fitting that scenario are covered in Scenario 5.

Scenario 14:

This is likely an invalid scenario as it should not be possible to have a removal tamper without an accompanying power loss. TQA should filter this situation.

Scenario 15:

This is likely an Invalid scenario as it should not be possible to have a inversion tamper without an accompanying power loss. TQA should filter this situation.

Although the above examples depict certain theft scenarios, one skilled in the art will realize that others are possible. Also, although some of the scenarios are unlikely, there may be instances when these scenarios lead to a specific theft determination. Accordingly, the system should not be taken to only incorporate the exemplary scenarios described herein.

As discussed above, aspects of the technology help to tell a story of what has occurred at a meter, whether the occurrence is a theft scenario, an infrastructure problem (such as a hot socket), or another event. In some cases, the system may be integrated with data related to servicing of a meter. In these cases, such as when a new meter is installed at a location, the system may be useful in quickly determining a theft scenario at the location of the new meter, because tampers typically occur soon after. The system may also filter out such tamper when it determines that the tampers were generated from servicing of a meter.

The system may also indicate other types of infrastructure problems. For example, the indication of a "reverse rotation" tamper may simply be a meter that has tipped over, or the occurrence of a hot socket where arcing may be occurring within the meter. In these cases the system may be utilized to fix and/or prevent outages or other problems. For example, the system may automatically output or provide certain instructions and may also generate additional data for the utility, such as a work ticket, ticket for investigation by a theft investigator, and so forth. Further details on work tickets may be found in U.S. application Ser. No. 10/971,720, entitled Combined Scheduling and Management of Work Orders, Such as for Utility Meter Reading and Utility Servicing Events, filed Oct. 21, 2004 and U.S. Provisional Application No. 60/788,134, entitled Integrated Data Collection, Anomaly Detection and Investigation, Such as Integrated Mobile Utility Meter Reading, Theft Detection and Investigation System.

The system resolves flags into particular tamper scenarios to further generate evidence that can be used in thefts or other situations. These reports may be considered evidence, as they are generated to reflect a theft scenario. However, the reports may contain information other than the information specific to the tampers/theft scenario, such as the utility company's name, the person who generated the report and/or compiled the data for the report, the date and time of the report, and statements or other indications that the generation of such reports occurs as a normal course of business, and so on. Any information that leads to the report being considered a proper evidentiary report by a court or other legal body may be included in these reports.

The system may also be tied to work order software for the utility, so that tamper flags associated with work orders are filtered out, and tamper flag combinations associated with suspected thefts are processed into work orders for investigators or field personnel.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the technology in light of the above Detailed Description. While the above description describes certain embodiments of the technology, and describes the best mode contemplated, no matter how detailed the above appears in text, the technology can be practiced in many ways. Details of the data collection and processing system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the above Detailed Description section explicitly defines such terms. Accordingly, the actual scope of the technology encompasses not only the disclosed embodiments, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. A method of deducing a possible theft of a utility at a utility meter, the method comprising:
   receiving at a data collection center via a fixed network a first set of data flags and a second set of data flags from the utility meter, wherein each data flag indicates a corresponding count of an abnormal operation of the utility meter;
   filtering, at the data collection center remote from the utility meter, the second set of data flags to remove data flags that differ from corresponding data flags in the first set of data flags by a filter value;
   comparing, at the data collection center, the filtered two or more data flags to predetermined patterns of data flags relating to possible theft scenarios at the utility meter; and
   determining the possible theft of the utility at the utility meter based on the comparison conducted remotely from such utility meter.

2. The method of claim 1, wherein the received data flags indicate a time of occurrence of the abnormal operation of the utility meter that caused the data flag, the comparison further comprising:
   organizing the filtered data flags by time of occurrence of the abnormal operation of the utility meter; and
   comparing the organized data flags to the predetermined patterns of data flags.

3. The method of claim 1, wherein the received data flags indicate an order of occurrence of the abnormal operation of the utility meter that caused the data flag relative to the other received data flags, the comparison further comprising:
   organizing the filtered data flags by order of occurrence of the abnormal operation of the utility meter; and
   comparing the organized data flags to the predetermined patterns of data flags.

4. The method of claim 1, further comprising:
   receiving information related to previous use of the utility meter; and
   determining the possible theft of the utility at the utility meter based on the received historical information.

5. The method of claim 1, wherein determining a possible theft of the utility at the utility meter based on the comparison comprises determining that the theft has already occurred.

6. The method of claim 1, wherein determining a possible theft of the utility at the utility meter based on the comparison comprises determining that the comparison indicates a future theft of the utility.

7. The method of claim 1, further comprising:
   presenting the determined possible theft as evidence against a customer associated with the utility meter.

8. The method of claim 1, wherein filtering the received data flags comprises:
   removing data flags related to a loss of power at the utility meter due to a nontheft event at the utility meter;
   removing data flags related to reprogramming the utility meter;
   removing data flags related to errors in reading the utility meter; or
   removing data flags related to errors in multiple abnormal operation detections.

9. The method of claim 1, wherein the filtered data flags comprise at least three data flags, wherein the at least three data flags include at least one data flag related to an inversion event at the utility meter, one data flag related to a removal event at the utility meter, and one data flag related to a power loss event at the utility meter.

10. The method of claim 1, wherein the filtered data flags comprise at least three data flags, wherein the at least three data flags include at least one data flag related to a reverse rotation event at the utility meter, one data flag related to a removal event at the utility meter, and one data flag related to a power loss event at the utility meter.

11. The method of claim 1, wherein the filtered data flags comprise at least three data flags, wherein the at least three data flags include at least one data flag related to an inversion event at the utility meter, one data flag related to a reverse rotation event at the utility meter, and one data flag related to a power loss event at the utility meter.

12. A fixed network theft determination system capable of determining a theft scenario at one or more utility meters, comprising:
- a data collection component within the fixed network, wherein the data collection component is to receive a first set of data flags and a second set of data flags via a fixed network, wherein each data flag indicates a corresponding count of an abnormal operation of the utility meter;
- a data filtering component remote from the utility meter, wherein the data filtering component is to:
  - review the first set of data flags and the second set of data flags received by the data collection component,
  - remove the data flags in the second set of data flags that differ from the corresponding data flags in the first set of data flags by a filter value, and
  - identify data that indicates a possible irregularity in the operation of the utility meter; and
- a scenario recognition component, wherein the scenario recognition component is to:
  - retrieve the identified data from the data filtering component,
  - compare the identified data to predetermined utility meter operation scenarios, and
  - determine remotely from the utility meter a theft scenario based on the comparison.

13. The fixed network theft determination system of claim 12, wherein the data that indicates a possible irregularity includes data related to an inversion event at the utility meter, a removal event at the utility meter, and a power loss event at the utility meter.

14. The fixed network theft determination system of claim 12, wherein the data that indicates a possible irregularity includes data related to a reverse rotation event at the utility meter, a removal event at the utility meter, and a power loss event at the utility meter.

15. The fixed network theft determination system of claim 12, wherein the data that indicates a possible irregularity includes data related to an inversion event at the utility meter, a reverse rotation event at the utility meter, and a power loss event at the utility meter.

16. The fixed network theft determination system of claim 12, further comprising:
- a context information component, wherein the context information component provides information related to previous use of the utility meter to the scenario recognition component and the scenario recognition component determines the theft scenario based at least in part on the provided use information.

17. The fixed network theft determination system of claim 12, wherein the data collection component receives data related to operation of the utility meter from a data collection unit associated with the utility meter.

18. The fixed network theft determination system of claim 12, wherein the data collection component receives data related to operation of the utility meter from the utility meter.

19. A method as in claim 1, further including presenting the results of the comparison to a resolution component associated with the utility as evidence of a possible theft of the utility by the customer.

20. The method of claim 19, wherein presenting the predetermined pattern comprises creating a report to be used in a legal action against the customer.

21. The method of claim 19, wherein presenting the predetermined pattern comprises issuing an investigation ticket related to a future review of the utility meter.

22. The method of claim 19, further comprising:
- receiving weather information related to weather at the location of the utility meter; and
- presenting the weather information along with the predetermined pattern to the resolution component.

23. The method of claim 19, further comprising:
- receiving location information related to characteristics of the location of the utility meter; and
- presenting the location information along with the predetermined pattern to the resolution component.

24. The method of claim 19, further comprising:
- receiving customer payment information related to previous payments by the customer to the utility; and
- presenting the customer payment information along with the predetermined pattern to the resolution component.

25. The method of claim 19, further comprising:
- receiving historical information related to historical use of the utility meter; and
- presenting the historical information along with the predetermined pattern to the resolution component.

26. The method of claim 19, wherein the tamper indicators from the utility meter are received without alerting the customer.

27. The method of claim 1, wherein the filter value is $2^N$, wherein N is an integer value greater than 2.

28. The method of claim 1, wherein the first set of data flags is received before the second set of data flags.

29. The fixed network theft determination system of claim 12, wherein the filter value is $2^N$, wherein N is an integer value greater than 2.

* * * * *